(12) United States Patent
Phinisee et al.

(10) Patent No.: US 12,092,761 B2
(45) Date of Patent: Sep. 17, 2024

(54) SENSOR ASSEMBLY WITH DRAIN CHANNEL

(71) Applicants: Ford Global Technologies, LLC, Dearborn, MI (US); Valeo North America, Inc., Auburn Hills, MI (US)

(72) Inventors: Rashaun Phinisee, Ypsilanti, MI (US); Venkatesh Krishnan, Canton, MI (US); Sunil Reddy Patil, Troy, MI (US); Joseph Wlodyka, Flat Rock, MI (US); Ravi Surampudi, Canton, MI (US); Timothy Wiesner, Auburn Hills, MI (US); Yifu Xiao, Auburn Hills, MI (US); Luis Angel Gonzalez, Auburn Hills, MI (US); Paul True, Auburn Hills, MI (US)

(73) Assignees: Ford Global Technologies, LLC, Dearborn, MI (US); Valeo North America, Inc., Auburn Hills, MI (US)

( * ) Notice: Subject to any disclaimer, the term of this patent is extended or adjusted under 35 U.S.C. 154(b) by 543 days.

(21) Appl. No.: 17/318,373

(22) Filed: May 12, 2021

(65) Prior Publication Data

US 2022/0365175 A1 Nov. 17, 2022

(51) Int. Cl.
 *G01S 7/481* (2006.01)
 *B60W 60/00* (2020.01)
 *G01S 17/931* (2020.01)
(52) U.S. Cl.
 CPC ......... *G01S 7/4813* (2013.01); *B60W 60/001* (2020.02); *G01S 17/931* (2020.01); *B60W 2420/408* (2024.01)

(58) Field of Classification Search
 CPC .................................................. G01S 7/4813
 USPC ........................................................ 73/855
 See application file for complete search history.

(56) References Cited

U.S. PATENT DOCUMENTS

| 10,150,432 B2 | 12/2018 | Dry et al. |
| 10,302,744 B1 | 5/2019 | Krishnan et al. |
| 10,561,044 B2 | 2/2020 | Schmidt |
| 2020/0346590 A1* | 11/2020 | Shane ................. B60R 16/0222 |
| 2021/0286047 A1* | 9/2021 | Schulte ................... G01S 7/028 |

FOREIGN PATENT DOCUMENTS

DE    10218210489 A1    1/2020

OTHER PUBLICATIONS

International Search Report and Written Opinion re Appl. No. PCT/US2022/072256 filed May 11, 2022.

* cited by examiner

*Primary Examiner* — Walter L Lindsay, Jr.
*Assistant Examiner* — Philip T Fadul
(74) *Attorney, Agent, or Firm* — Frank A. MacKenzie; Bejin Bieneman PLC

(57) ABSTRACT

A sensor assembly includes an upper housing. The sensor assembly includes a monolithic lower housing fixed to the upper housing and defining a chamber therebetween. The monolithic lower housing defines a drain channel that slopes downward and outward in the chamber. The sensor assembly may be mounted to a roof of a vehicle. Specifically, the monolithic lower housing may be fixed to the roof.

18 Claims, 4 Drawing Sheets

SENSOR ASSEMBLY WITH DRAIN CHANNEL

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Exposure to excess liquid may interfere with operation of the sensors.

DETAILED DESCRIPTION

Figure 1:
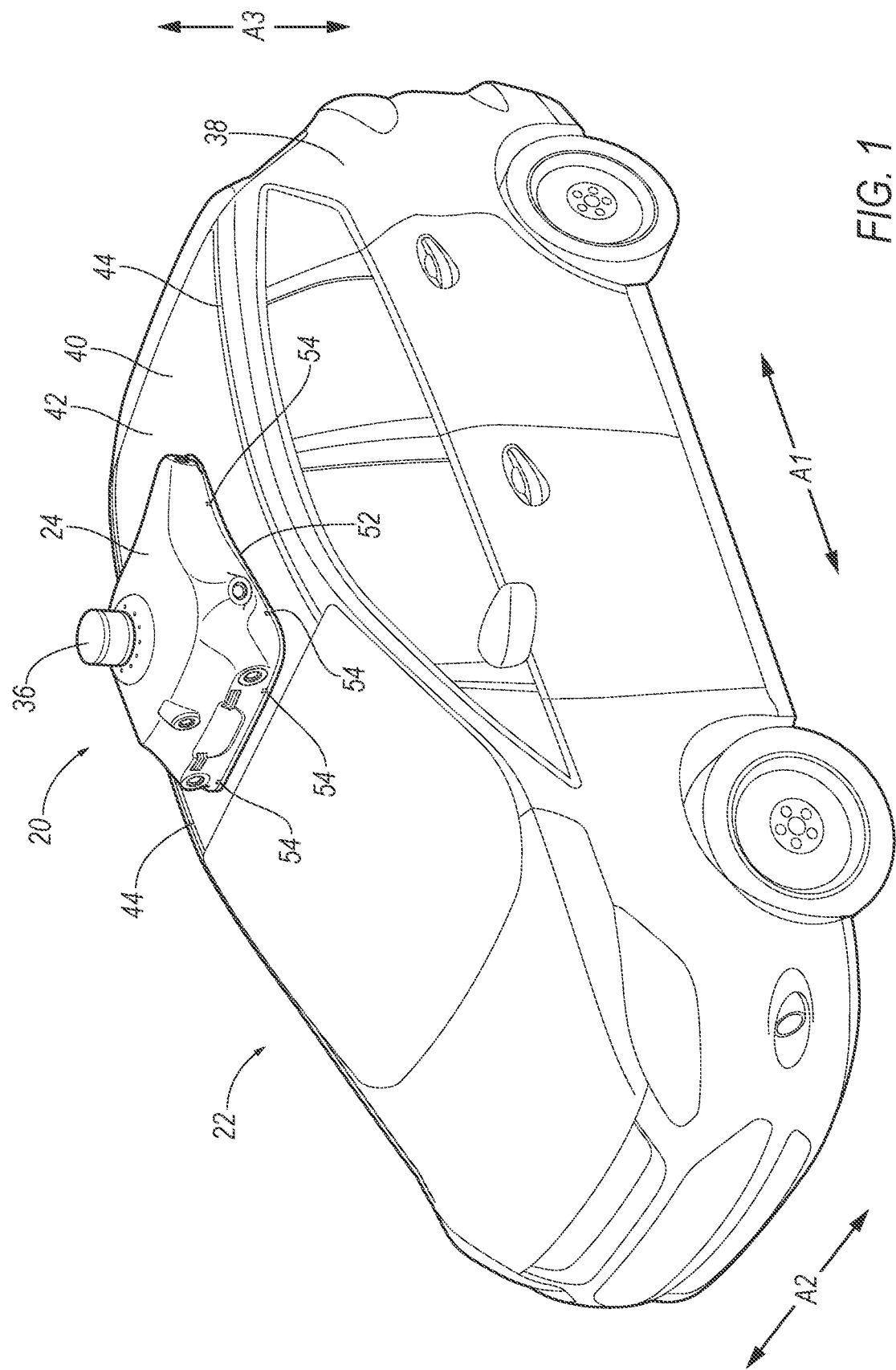
FIG. 1 is a perspective view of a sensor assembly mounted on a vehicle.

A sensor includes an upper housing. The sensor assembly includes a monolithic lower housing fixed to the upper housing and defining a chamber therebetween. The monolithic lower housing defines a drain channel that slopes downward and outward in the chamber.

The monolithic lower housing may include a top platform, and the drain channel may extend downward and outward from the top platform.

The sensor assembly may include a LIDAR sensor fixed to the top platform.

The monolithic lower housing may include a hip that is higher than adjacent portions of the monolithic lower housing. The hip may extend outward from the top platform. The drain channel may extend along the hip.

The monolithic lower housing may include a skirt that extends downward and outward toward a perimeter edge of the monolithic lower housing, and the drain channel may extend from the top platform to the skirt.

The upper housing and the monolithic lower housing may define a second chamber isolated from the chamber.

The monolithic lower housing may define a second drain channel that slopes downward and outward in the second chamber.

The monolithic lower housing may include an arcuate bottom surface.

The monolithic lower housing may include a skirt and a wall extending vertically from the skirt, and the drain channel may extend along the wall to the skirt.

The monolithic lower housing may include a platform at a top of the wall, and the drain channel may extend along the platform.

The wall may include a first portion that extends upward beyond the platform and a second portion that extends upward beyond the platform on an opposite side of the drain channel from the first portion.

The skirt may extend downward and forward from the drain channel.

A vehicle includes a roof. The vehicle includes a monolithic lower housing fixed to the roof and defining a drain channel that slopes downward toward the roof and outward relative to a center of the monolithic lower housing. The vehicle includes an upper housing fixed to the monolithic lower housing and defining a chamber, the drain channel being in the chamber.

A top surface of the roof may define a contour, and the monolithic lower housing may have a bottom surface that defines a contour that matches the contour of the roof.

The roof may extend downward and outward from the monolithic lower housing to a gutter.

The monolithic lower housing may include a top platform, and the drain channel may extend downward and outward from the top platform.

The vehicle may include a LIDAR sensor fixed to the top platform.

The monolithic lower housing may include a hip that is higher than adjacent portions of the monolithic lower housing, the hip may extend outward from the top platform, and the drain channel may extend along the hip.

The monolithic lower housing may include a skirt, and the drain channel may extend from the top platform to the skirt.

With reference to the Figures, wherein like numerals indicate like parts throughout the several views, a sensor assembly 20 for collecting data, e.g., to autonomously operate a vehicle 22, includes an upper housing 24 and a monolithic lower housing 26 fixed to the upper housing 24. The upper housing 24 and monolithic lower housing 26 define a chamber 28, 30 therebetween. The monolithic lower housing 26 defines a drain channel 32, 34 that slopes downward and outward in the chamber 28, 30. The drain channel 32, 34 aids in removing liquid from within the chamber. For example, gravity may urge liquid in the chamber 28, 30 along the drain channels 32, 34, e.g., away from sensors 36 of the sensor assembly 20.

Figure 2:
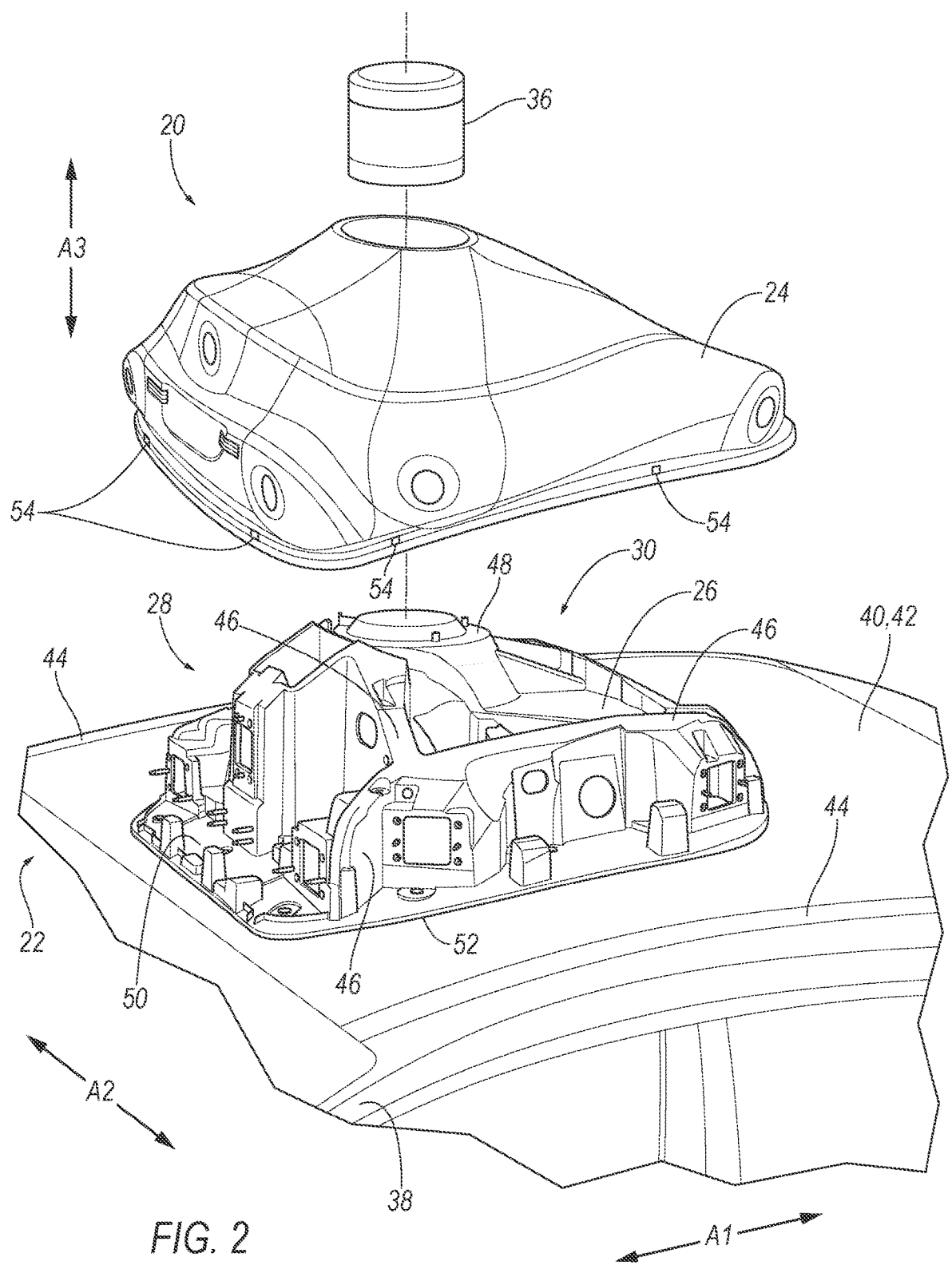
FIG. 2 is a perspective exploded view of the sensor assembly mounted on the vehicle.

With reference to FIGS. 1 and 2, the vehicle 22 may be any passenger or commercial automobile such as a car, a truck, a sport utility vehicle, a crossover, a van, a minivan, a taxi, a bus, etc.

The vehicle 22 may be an autonomous vehicle. A computer can be programmed to operate the vehicle 22 independently of the intervention of a human driver, completely or to a lesser degree. The computer may be programmed to operate a propulsion, brake system, steering, and/or other systems of the vehicle 22 based at least in part on data received from the sensors 36 of the sensor assembly 20. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering.

In the present application, relative vehicular orientations and directions (by way of example, top, bottom, front, rear, outboard, inboard, inward, outward, lateral, left, right, forward, rearward, etc.) is from the perspective of the vehicle 22. The forward direction of the vehicle 22 is the direction of movement of the vehicle 22 when the vehicle 22 is engaged in forward drive with wheels of the vehicle 22 pointed straight. Orientations and directions relative to the sensor assembly 20 are given related to when the assembly is supported by the vehicle 22 as described below and shown in the Figures.

The vehicle 22 defines a longitudinal axis A1 extending between a front and a rear of the vehicle 22. The vehicle defines a lateral axis A2 extending between a left side and a right side of the vehicle 22. The vehicle 22 defines a vertical axis A3 extending between a top and a bottom of the vehicle 22. The longitudinal axis A1, the lateral axis A2, and the vertical axis A3 are perpendicular relative to each other.

The vehicle 22 includes a body 38. The vehicle 22 may be of a unibody construction, in which a frame and the body 38 of the vehicle 22 are a single component. The vehicle 22 may, alternatively, be of a body-on-frame construction, in which the frame supports the body 38 that is a separate component from the frame. The frame and body 38 may be formed of any suitable material, for example, steel, aluminum, etc. The body 38 includes body panels partially defining an exterior of the vehicle 22. The body 38 panels may present a class-A surface, e.g., a finished surface exposed to view by a customer and free of unaesthetic blemishes and defects. The body 38 panels include, e.g., a roof 40, etc. The roof 40 may include a top surface 42, e.g., that faces upward. The roof 40 may include a gutter 44 at the top surface 42 that directs liquid forward and/or rearward, e.g., such that such liquid does not flow over doors of the vehicle 22. The top surface 42 of the roof 40 defines a contour, e.g., the top surface 42 may be arcuate and increase in slope as a function of a distance from a center of the roof 40 along the longitudinal axis A1 or the lateral axis A2. For example, the slope of the top surface 42 may be higher relatively farther from the center than relatively closer to the center. The roof 40 extends downward and outward from the center of the roof 40 to the gutter 44. The gutter 44 may define a channel elongated along the longitudinal axis A1.

The sensors 36 may include a variety of devices such as are known to provide data indicating detected objects to the vehicle computer, e.g., from respective fields of view. For example, the sensors 36 may include LIght Detection And Ranging (LIDAR) sensors that provide relative locations, sizes, and shapes of objects surrounding the vehicle. As another example, the sensors 36 may include radar sensors that provide data to indicating locations of the objects, second vehicles, etc., relative to the location of the vehicle. The sensors 36 may further alternatively or additionally, for example, include camera(s), e.g., front view, side view, etc., providing images from an area surrounding the vehicle. The camera includes an image sensor, such as a CCD sensor or a CMOS sensor, to generate data from light that is detected by the camera. The image may be specified in the data as an array of pixels having different values of color, brightness, etc. The sensors 36 may provide the data to a computer, e.g., via a communication network, such as a vehicle bus or the like.

Figure 3:
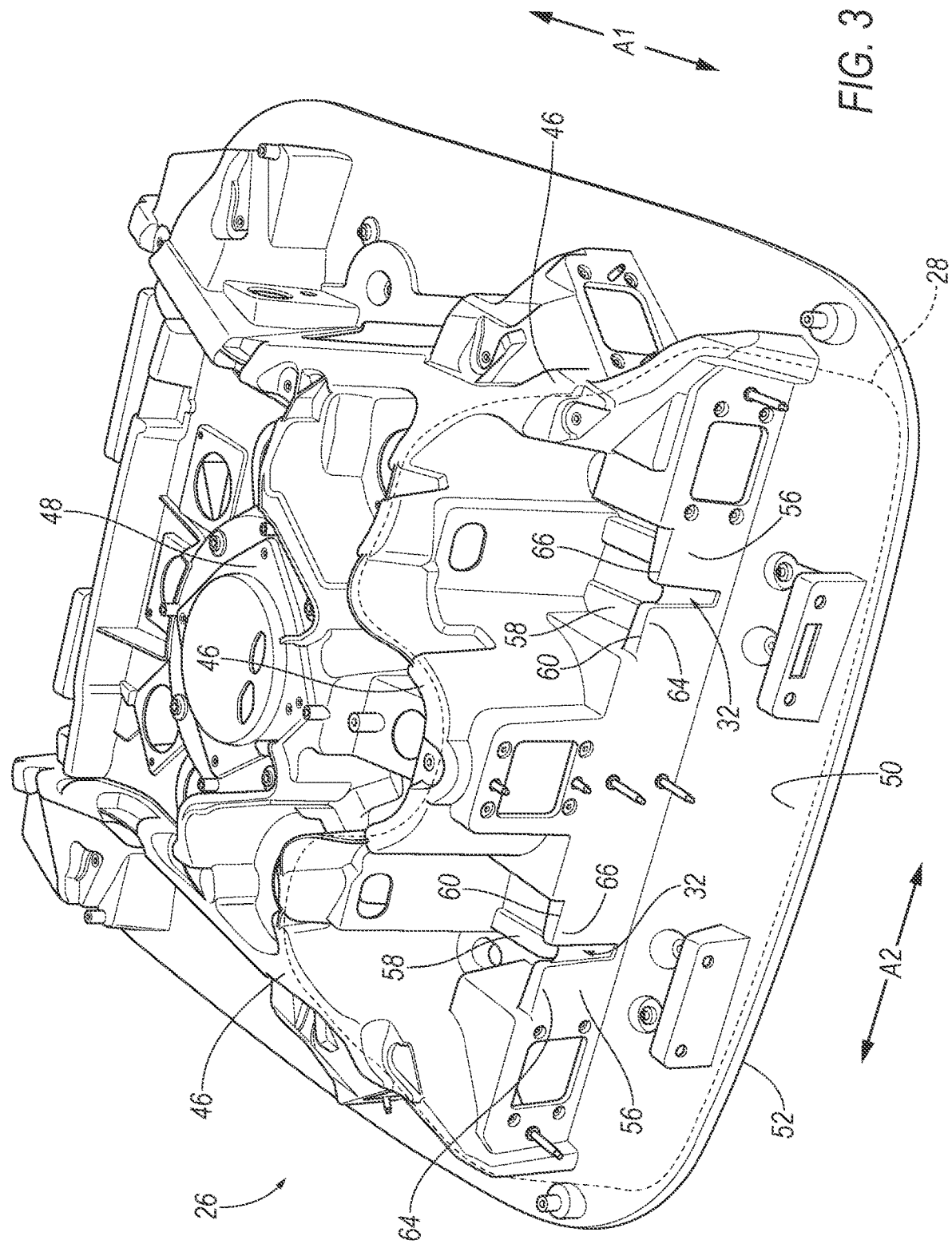
FIG. 3 is a front perspective view of a lower housing of the sensor assembly.
Figure 4:
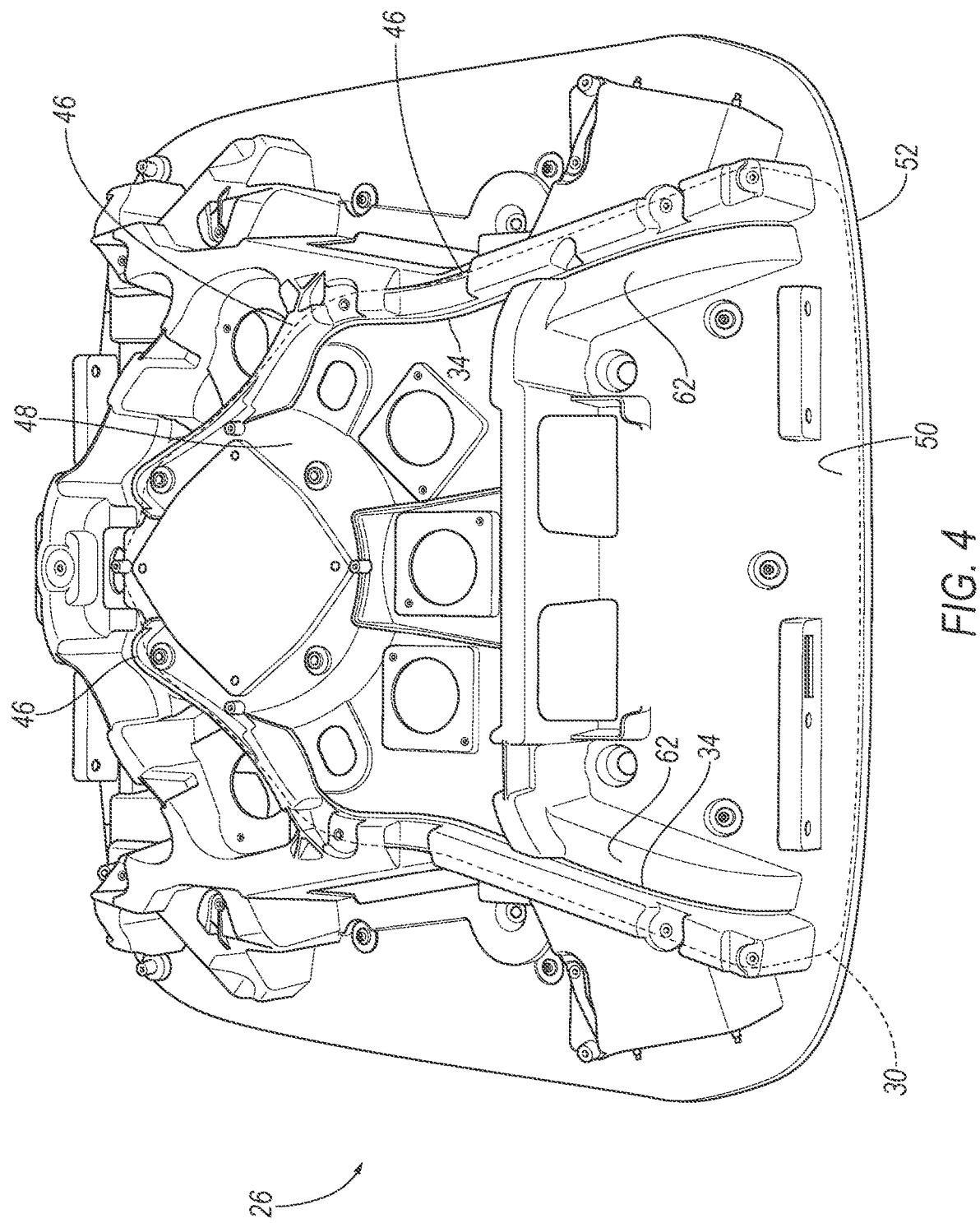
FIG. 4 is a rear perspective view of the lower housing of the sensor assembly.

With reference to FIG. 2-4, the sensor assembly 20 includes the lower housing 26 and one or more upper housings 24. The sensor assembly 20 is attachable to one of the body panels of the vehicle 22, e.g., the roof 40, which can provide the sensors 36 with an unobstructed field of view of an area around the vehicle 22. The lower housing 26 may be fixed to the roof 40, e.g., with a fastener or the like. The lower housing 26 may include a bottom surface for attachment to the top surface 42 of the roof 40. The bottom surface faces downward and may abut the top surface 42. The lower housing 26 may be fixed to the roof 40, e.g., with a fastener, at the bottom surface. The bottom surface may be arcuate, e.g., increasing in slope as a function of a distance from the center of the roof 40. The bottom surface may define a contour that matches the contour of the roof 40, e.g., such that the lower housing 26 continuously abuts the top surface 42 of the roof 40 along the bottom surface. The roof 40 may extend downward and outward from the monolithic lower housing 26 to the gutter 44, e.g., such that gravity urges liquid flow from a skirt 50 of the lower housing 26 to the top surface 42 and to the gutter 44.

The one or more upper housings 24 are shaped to fit together with lower housing 26. The upper housings 24 fit on top of the lower housing 26. The upper housings 24 and the lower housing 26 may be plastic or any suitable material. The lower housing 26 is fixed to the upper housings 24, e.g., with a fastener or the like. The lower housing 26 and the upper housing 24 are each monolithic. Monolithic means a single, uniform piece of material with no seams, joints, fasteners, or adhesives holding it together, i.e., formed together simultaneously as a single continuous unit, e.g., by machining from a unitary blank, molding, forging, casting, etc. Non-monolithic components, in contrast, are formed separately and subsequently assembled, e.g., by threaded engagement, welding, etc.

The upper housings 24 cover the lower housing 26. The upper housings 24 and the lower housing 26 define one or more chambers 28, 30 therebetween. With refence to FIGS. 2 and 3, the lower housing 26 and one or more of the upper housings 24 may define, e.g., enclose, a first chamber 28 at a front of the sensor assembly 20. With refence to FIGS. 2 and 4, The lower housing 26 and one or more of the upper housings 24 may define a second chamber 30 at a rear of the sensor assembly 20. The first chamber 28 may be isolated from the second chamber 30, i.e., such that fluid is restricted, or inhibited, from flowing therebetween. For example, the lower housing 26 have one or more barrier walls 46 that extend upward toward one or more of the upper housings 24. The barrier walls 46 may extend along the lateral axis A2. The barrier walls 46 may isolate the first chamber 28 from the second chamber 30. The sensor assembly 20 may include other structures, e.g., baffles or the like, that isolate the first chamber 28 and the second chamber 30 from each other.

The lower housing 26 may include a top platform 48 that is an uppermost planar portion of the lower housing 26. The top platform 48 has a generally flat upward facing surface that extends along the longitudinal axis A1 and the lateral axis A2. The top platform 48 may be centered relative to the vehicle 22 and/or the sensor assembly 20 along the lateral axis A2. One of the sensors 36, e.g., a LIDAR sensor, may be fixed to the top platform 48. Such sensor 36 may be fixed to the top platform 48 with fasteners or the like and may extend upward beyond the upper housings 24, e.g., as shown in FIG. 1.

The monolithic lower housing 26 may include the skirt 50 that extends downward and outward toward a perimeter edge 52 of the lower housing 26. For example, the skirt 50 may surround other portions of the lower housing 26 and be angled such that liquid on the skirt 50 is urged by gravity toward the perimeter edge 52. The sensor assembly 20 may include one or more drain holes 54, e.g., through the upper housings 24 at the perimeter edge 52 of the lower housing 26. The drain holes 54 permit fluid to flow from the skirt 50 to outside the first chamber 28 and/or the second chamber 30.

With reference to FIG. 3, the lower housing 26 may include a wall 56 extending vertically from the skirt 50, e.g., to platforms 58 on the right and the left of the center of the sensor assembly 20 along the lateral axis A2. The platforms 58 may be at a top of the wall 56, e.g., closer to a distal edge 60 of the wall 56 than to the skirt 50. The wall 56 may be elongated along the lateral axis A2, i.e., the wall 56 is longer along the lateral axis A2 than along the longitudinal axis A1 and than along the vertical axis A3. The platforms 58 may be generally planar and slope toward the wall 56, i.e., such that gravity urges liquid on the platforms 58 toward the wall 56.

With reference to FIG. 4, the lower housing 26 may include one or more hips 62, e.g., one to the right and one the left of the center of the sensor assembly 20 along the lateral axis A2. Each hip 62 is higher than adjacent portions of the monolithic lower housing 26, e.g., forward and rearward of the hip 62 and/or to the right and the left of each hip 62. Each hip 62 extends outward from the top platform 48, e.g., one toward the right side of the vehicle 22 and one toward the left side of the vehicle 22. The hips 62 may extend rearward along the top surface 42 of the roof 40.

Returning to FIGS. 3 and 4, the lower housing 26 defines one or more drain channels 32, 34, e.g., in the first chamber 28 and/or the second chamber 30. The drain channels 32, 34 slope outward, e.g., toward the skirt 50, and downward, e.g., toward the roof 40. The lower housing 26 along the drain channels 32, 34 is lower than portions of the lower housing 26 adjacent the drain channels 32, 34. The drain channels 32, 34 control flow of liquid e.g., in the first chamber 28 and the second chamber 30 and such that gravity urges liquid along the drain channels 32, 34 to the skirt 50. In other words, a height of each of the drain channels 32, 34 deceases as the drain channels 32, 34 extends toward the skirt 50.

With reference to FIG. 3, the drain channels 32 in the first chamber 28 are illustrated. The drain channels 32 may extend along the wall 56, e.g., from the platforms 58 to the skirt 50. The drain channel 32 may extend from behind the wall 56 to in front of the wall 56, i.e., through the wall 56. For example, the wall 56 may include a first portion 64 that extends upward beyond the platform 58 and a second portion 66 that extends upward beyond the platform on opposite sides of each of the drain channels 32, 34. In other words, the drain channels 32, 34 may be between the first portions 64 and the second portions 66, e.g., along the lateral axis A2.

With reference to FIG. 4, the drain channels 34 in the second chamber 30 are shown. The drain channel 34 may extend downward and outward from the top platform 48. For example, the drain channels 34 may extend along the hips 62, e.g., each of the drain channels 34 may extend along a ridgeline of the respective hip 62. The drain channels 34 may extend from the top platform 48 to the skirt 50, e.g., such that gravity urges liquid from the top platform 48 along the hips 62 via the drain channels 34 to the skirt 50.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly, comprising:
    an upper housing; and
    a monolithic lower housing fixed to the upper housing and defining a chamber therebetween, the monolithic lower housing defining a drain channel that slopes downward and outward in the chamber;
    the upper housing and the monolithic lower housing defining a second chamber isolated from the chamber; and
    the monolithic lower housing defining a second drain channel that slopes downward and outward in the second chamber.

2. The sensor assembly of claim 1, wherein the monolithic lower housing includes a top platform, and the drain channel extends downward and outward from the top platform.

3. The sensor assembly of claim 2, further comprising a LIDAR sensor fixed to the top platform.

4. The sensor assembly of claim 2, wherein the monolithic lower housing includes a hip that is higher than adjacent portions of the monolithic lower housing, wherein the hip extends outward from the top platform, and wherein the drain channel extends along the hip.

5. The sensor assembly of claim 2, wherein the monolithic lower housing includes a skirt that extends downward and outward to a perimeter edge of the monolithic lower housing, and wherein the drain channel extends from the top platform to a top surface of the skirt.

6. The sensor assembly of claim 1, wherein the monolithic lower housing includes an arcuate bottom surface.

7. The sensor assembly of claim 1, wherein the monolithic lower housing includes a skirt and a wall extending vertically from the skirt, and wherein the drain channel extends along the wall to the skirt.

8. The sensor assembly of claim 7, wherein the monolithic lower housing includes a platform at a top of the wall, and wherein the drain channel extends along the platform.

9. The sensor assembly of claim 8, wherein the wall includes a first portion that extends upward beyond the platform, and wherein the wall includes a second portion that extends upward beyond the platform on an opposite side of the drain channel from the first portion.

10. The sensor assembly of claim 7, wherein the skirt extends downward and forward from the drain channel.

11. A vehicle, comprising:
    a roof;
    a monolithic lower housing fixed to the roof and defining a drain channel that slopes downward toward the roof and outward relative to a center of the monolithic lower housing; and
    an upper housing fixed to the monolithic lower housing and defining a chamber, the drain channel being in the chamber; and
    the roof extending downward and outward from the monolithic lower housing to a gutter.

12. The vehicle of claim 11, wherein a top surface of the roof defines a contour, and the monolithic lower housing has a bottom surface that defines a contour that matches the contour of the roof.

13. The vehicle of claim 11, wherein the monolithic lower housing includes a top platform, and the drain channel extends downward and outward from the top platform.

14. The vehicle of claim 13, further comprising a LIDAR sensor fixed to the top platform.

15. The vehicle of claim 13, wherein the monolithic lower housing includes a hip that is higher than adjacent portions of the monolithic lower housing, wherein the hip extends outward from the top platform, and wherein the drain channel extends along the hip.

16. The vehicle of claim 13, wherein the monolithic lower housing includes a skirt, and the drain channel extends from the top platform to the skirt.

17. A sensor assembly, comprising:
an upper housing; and
a monolithic lower housing fixed to the upper housing and defining a chamber therebetween, the monolithic lower housing defining a drain channel that slopes downward and outward in the chamber;
the monolithic lower housing includes a skirt and a wall extending vertically from the skirt, and the drain channel extends along the wall to the skirt;
the monolithic lower housing including a platform at a top of the wall; and
the drain channel extending along the platform.

18. The sensor assembly of claim 17, wherein the wall includes a first portion that extends upward beyond the platform, and wherein the wall includes a second portion that extends upward beyond the platform on an opposite side of the drain channel from the first portion.

\* \* \* \* \*